No. 707,173. Patented Aug. 19, 1902.
J. C. W. STANLEY.
APPARATUS FOR SEPARATING STONES, &c.
(Application filed July 1, 1901.)
(No Model.) 2 Sheets—Sheet 2.
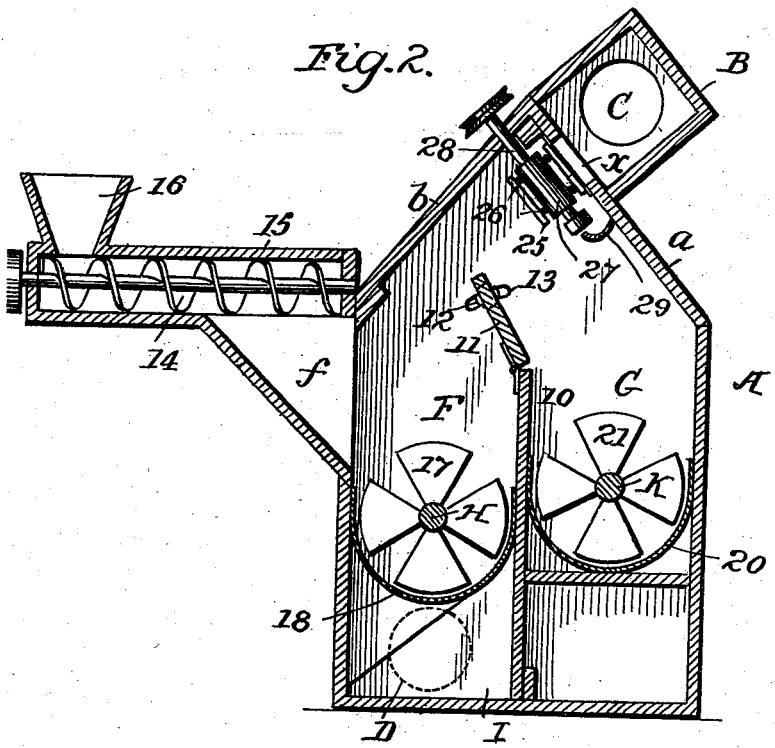
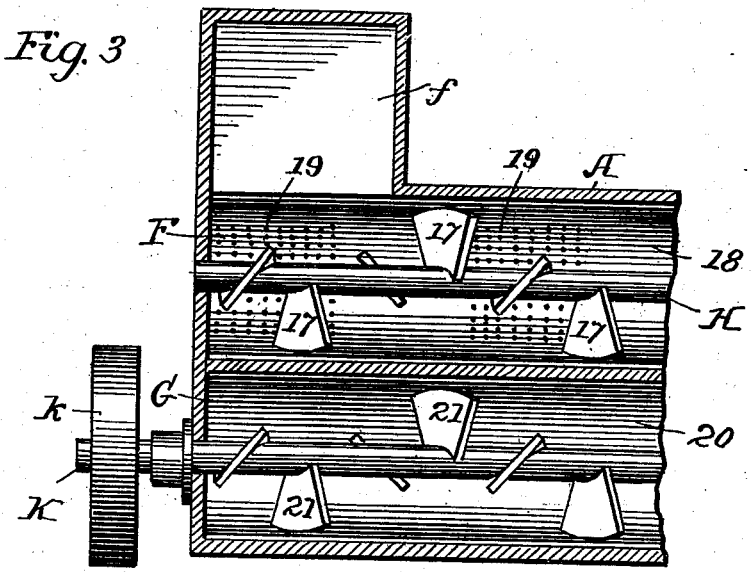

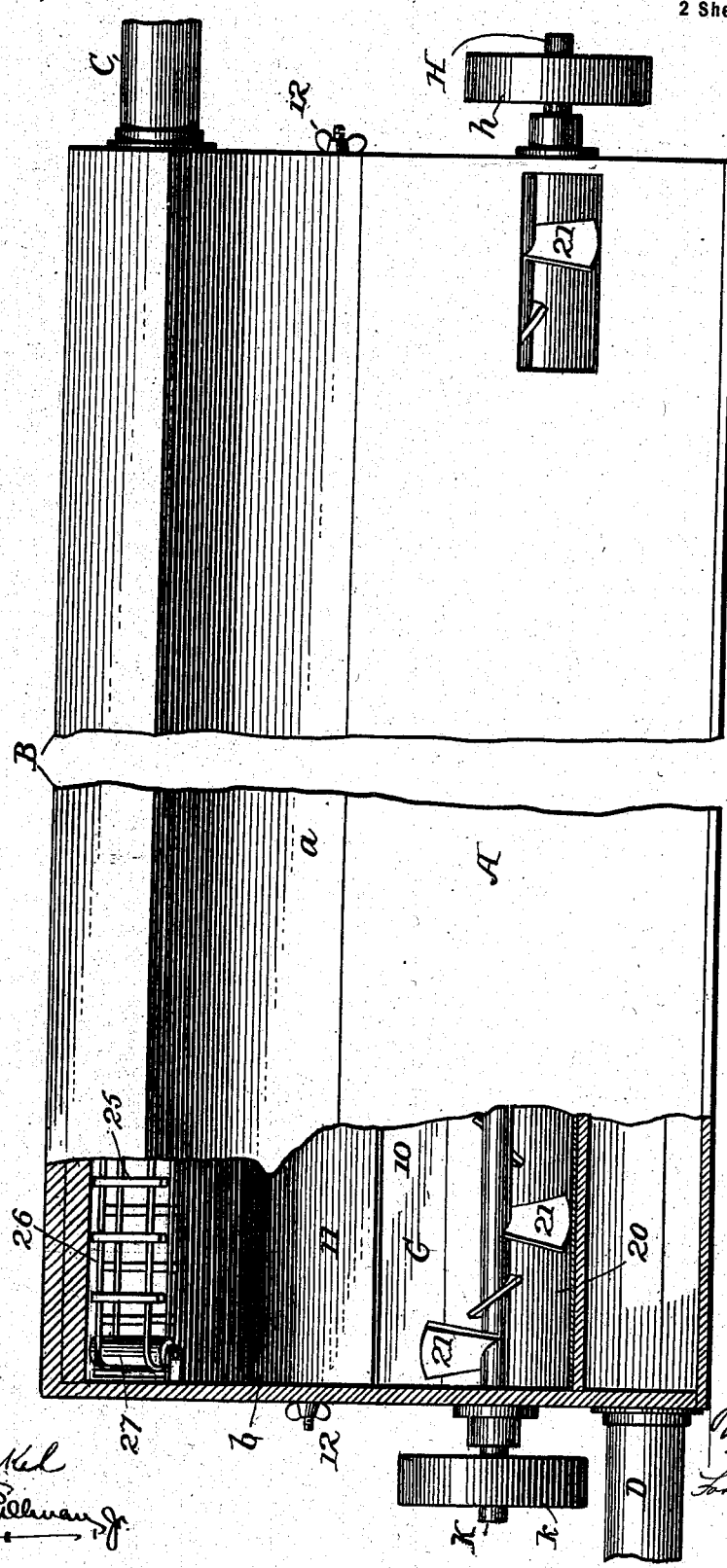

United States Patent Office.

JOHN CHARLES WILLIAM STANLEY, OF LONDON, ENGLAND.

APPARATUS FOR SEPARATING STONES, &c.

SPECIFICATION forming part of Letters Patent No. 707,173, dated August 19, 1902.

Application filed July 1, 1901. Serial No. 66,732. (No model.)

*To all whom it may concern:*

Be it known that I, JOHN CHARLES WILLIAM STANLEY, a subject of the King of England, residing at London, England, have invented certain new and useful Improvements in Apparatus for Separating Stones, &c., of which the following is a specification.

This invention relates to apparatus for separating stones, &c., from seeds, and particularly from cotton-seed; and the object of the invention is to provide an apparatus for this purpose in which the separation is effected by means of air under pressure acting upon the mixed stones and seeds and which by reason of the difference in the specific gravity of the stones and the seeds will carry the seeds away from the stones.

The invention will be fully described hereinafter, reference being had to the accompanying drawings, in which—

Figure 1 is a side elevation of an apparatus constructed in accordance with my invention. Fig. 2 is a section on the line 2 2 of Fig. 1, and Fig. 3 is a horizontal section of a portion of the apparatus.

The inclosing casing (represented as a whole by A) will be practically air-tight except as to the outlets provided for the exit of air and the inlet and outlets for the material to be treated. The top or cover of the casing will be in the form of a roof formed by the two inclined sides *a* and *b*, and on the exterior of the former a conduit B will be supported, such conduit communicating with the interior of the casing A through an elongated opening *x*, formed in the inclined side *a*. The conduit B will be closed at one end, and from the other end an air-escape pipe C will lead, such pipe being of substantially the same diameter as the air-inlet pipe D at the other end of the casing.

The opening *x* is covered by a perforated plate *y* for a purpose to be hereinafter referred to.

Extending longitudinally of the casing A is a vertical partition 10, and to the upper edge of the partition a deflecting-plate 11 is hinged and extends at an inclination thereto toward the side *b* of the roof. The degree of inclination of the plate 11 may be adjusted by means of pins 12, which extend through segmental slots 13 in the end walls of the casing, and any suitable locking device may be employed to hold the plate in an adjusted position. Two chambers F and G are thus formed, which communicate through the space or passage between the side *b* of the roof and the upper edge of the deflecting-plate 11. At one end of the chamber F is a feed-chute *f*, and a screw conveyer 14, inclosed within a casing 15, conveys the mixed seeds and stone from a hopper 16 to the chute *f*, and when the machine is in operation the material being fed to the chute *f* will prevent any undue escape of air in that direction.

A shaft H extends longitudinally through the chamber F and is supported in suitable bearings secured to the end walls of the casing, and one end projects beyond the casing and is provided with a pulley *h*, by means of which the shaft may be driven from any source of power. (Not shown.) A series of blades 17 are secured to the shaft H and are arranged spirally thereon and have the necessary pitch to convey material fed in through the chute *f* to the other end of the chamber F. A semicylindrical plate 18 is supported within the chamber F, and the outer ends of the blades 17 will work in close proximity to it. The lower portion of the plate 18 will be perforated or slotted at intervals throughout its length, as indicated at 19 in Fig. 3.

Below the plate 18 is a chamber I, into one end of which air under pressure is delivered through the pipe D, and the only escape for such air is through the slots or perforations in the plate 18. Any suitable device may be employed for delivering air under pressure to the pipe D, and it is not necessary to illustrate it.

Within the chamber G an imperforate semicylindrical plate 20 is supported, and a shaft K extends longitudinally through the chamber and is provided at one end exterior of the casing with a driving-pulley *k*. A series of blades 21 are secured to the shaft K and are arranged spirally thereon and have the necessary pitch to feed material received on the plate 20 to one end of the chamber G. Each of the chambers F and G will have outlet-openings for the material carried along by the conveyers in the respective chambers, and such outlets may, if desired, have removable closures.

The operation will be as follows: The material to be treated will be fed into the hopper 16 and conveyed thence to the chute f, from which it will fall to the plate 18, and the blades 17 will move it along toward the other end of the chamber F. The chamber I will be kept constantly charged with air under pressure, which will pass through the slots or perforations in the plate 18 with sufficient force or velocity to carry the seeds with it upwardly against the inclined side b of the casing, and they will be deflected to the other side of the plate 11 and fall onto the plate 20 in the chamber G, and the blades 21 will move it along to the outlet-opening provided for its discharge. The air in the meantime will escape through the perforated plate y into the conduit B and out through the pipe C. The blades 17 being separated from each other will keep the material stirred up and agitated while moving it along, and thereby separate the seeds one from the other in case they have become matted together, which is frequently the case with cotton-seed. A continuous spiral blade would not effect this result. As the material is moved along the plate 18 from the feed end of the casing the seed will be gradually blown away from the stones, &c., and only the latter will remain to be discharged from the outlet-opening of the chamber F. The deflecting-plate 11 will prevent the seeds from striking the inclined side at too high a point, and the limit of the striking-point can be varied by adjusting the plate 11. There will be considerable dust and other light impurities carried upward with the air from the material being treated, and in the case of cotton-seed there will be some lint, and while much of the dust will pass through the perforated plate y the lint and other particles will collect upon said plate and tend to choke the perforations unless they are removed. Various devices might be employed for this purpose, and as illustrative thereof I have shown a series of slats or scrapers 25, connected to endless bands or belts 26 and forming practically a slat belt. The belts are mounted upon pulleys 27 on shafts 28, one of which will be positively driven by any suitable means, and thereby drive the slatted belt. The latter will be so supported that the front edges of the slats will scrape over the plate y, and thus remove any matter tending to adhere to it. Such matter may be permitted to fall into the chamber G or into a trough 29, from whence it may be removed at intervals.

Without limiting myself to the precise details illustrated and described, I claim—

1. In an apparatus for separating stones, &c., from seed, the combination of an inclosing casing having a vertical partition dividing it into two chambers, a perforated plate supported in one chamber above the bottom thereof, means to feed the material to be treated onto one end of said plate, means to move it along said plate, means for introducing air under pressure below said perforated plate, and means to deflect the seed carried up by the air from the perforated plate into the other chamber, substantially as set forth.

2. In an apparatus for separating stones, &c., from seed, the combination of an inclosing casing having a cover formed of inclined sides, a vertical partition dividing said casing into two chambers communicating at their upper portions, a perforated plate in one chamber above the bottom thereof, means to feed the material to be treated to one end of said plate, means to move the material along said plate, means for introducing air under pressure below said plate, and a perforated plate in the upper part of the casing for the exit of the air, substantially as set forth.

3. In an apparatus for separating stones, &c., from seed, the combination of an inclosing casing having a cover formed of inclined sides, a vertical partition dividing said casing into two chambers communicating at their upper portions, a deflecting-plate hinged to the upper edge of said partition and inclined over one chamber, a perforated plate supported in the latter chamber above the bottom thereof, means to feed the material to be treated to one end of said plate, means to move the material along said plate, means for introducing air under pressure below the said plate, and an air-exit in the inclined side of the roof above the other chamber, substantially as set forth.

4. In an apparatus for separating stones, &c., from seed, the combination of an inclosing casing having a vertical partition dividing it into two chambers, a perforated plate supported in one chamber above the bottom thereof, means to feed the material to be treated to one end of said plate, a shaft journaled above said plate, a series of separated blades connected to said shaft and arranged spirally thereon to move the material along said plate, means for introducing air under pressure below said plate, and means to deflect the seed carried up by the air into the other chamber, substantially as set forth.

5. In an apparatus for separating stones, &c., from seed, the combination of an inclosing casing having a vertical partition dividing it into two chambers, a perforated plate supported in one chamber above the bottom thereof, means to deliver the material to be treated to one end of said plate, means to move the material along said plate, means for introducing air under pressure below the plate, means to deflect the seed carried up by the air into the other chamber, a perforated plate in said casing for the exit of the air, and means to remove material tending to adhere to the latter plate, substantially as set forth.

In testimony whereof I have signed my name to this specification in the presence of two subscribing witnesses.

JOHN CHARLES WILLIAM STANLEY.

Witnesses:
WILLIAM A. PERRY, Jr.,
ISAIAH A. HUSON, Jr.